Oct. 31, 1961  R. M. HENSEN  3,007,024
ELECTRIC HEATING SYSTEM
Filed July 6, 1959  2 Sheets-Sheet 2

Ray M. Hensen
INVENTOR.

BY Clarence A. O'Brien
and Harvey B. Jacobson
Attorneys

United States Patent Office 3,007,024
Patented Oct. 31, 1961

3,007,024
ELECTRIC HEATING SYSTEM
Ray M. Hensen, Adrian, Minn., assignor to Food Saver, Inc., a corporation of Minnesota
Filed July 6, 1959, Ser. No. 825,346
4 Claims. (Cl. 219—20)

This invention relates generally to heating systems and more particularly to electric heating systems and control means therefor.

Heating systems today generally utilize gas or oil as the combustion element. The invention herein discloses electrical heating systems used for hot water, forced air, low pressure steam, or in connection with any further heating application.

Advantages of electrical heating are apparent inasmuch as there is less heat loss because of the absence of a chimney and also advantages are noted in the fact that electric heating is free from soot and dirt which are products of other fuels.

It is the principal object of this invention to provide a novel and improved electrical heating system and control circuit therefor which may be used for efficiently heating in any of a plurality of applications.

It is a further object of this invention to provide a novel electric heating system and control circuit therefor which is inexpensive to install and utilize and which is reliable in operation inasmuch as a minimum of moving parts are utilized.

It is a more particular object of this invention to provide a novel electrical heating system and control circuit therefor which includes a low voltage control circuit and high voltage heating circuit. Included in the low voltage control circuit is an indoor thermostat which is serially connected with a plurality of outdoor temperature responsive switches. Serially connected with each of the temperature responsive switches is a low voltage relay coil which is disposed to control a high voltage switch. In turn, each high voltage switch is serially connected with a high voltage relay coil across a high voltage source. The high voltage relay coil is disposed so as to control a double-pole single-throw switch for energizing a heating element. The invention contemplates the utilization of three heating elements and three sets of relays and temperature responsive switches. The temperature responsive switches are in the form of vials having spaced contacts which may be bridged by a conductive liquid carried in the vials. The vials are adjustably angularly mounted on a disk which is graduated and rotatable. The disk is rotated by a temperature responsive coil spring secured between a fixed point and the disk. Accordingly, as the temperature varies, the coil spring will cause the disk to change its angular relationship and bridge the spaced contacts in the vials with the conductive liquid. It is therefore seen that when more heat is demanded indoors, and when the temperature is below a certain level outdoors, relays will be actuated to energize a heating coil to raise the temperature. Inasmuch as the outdoor temperature responsive switches are independently operated, the heating elements are likewise independently operated. Means are provided for shunting the temperature responsive switches if desired for immediately energizing all of the heating coils regardless of the outside temperature.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
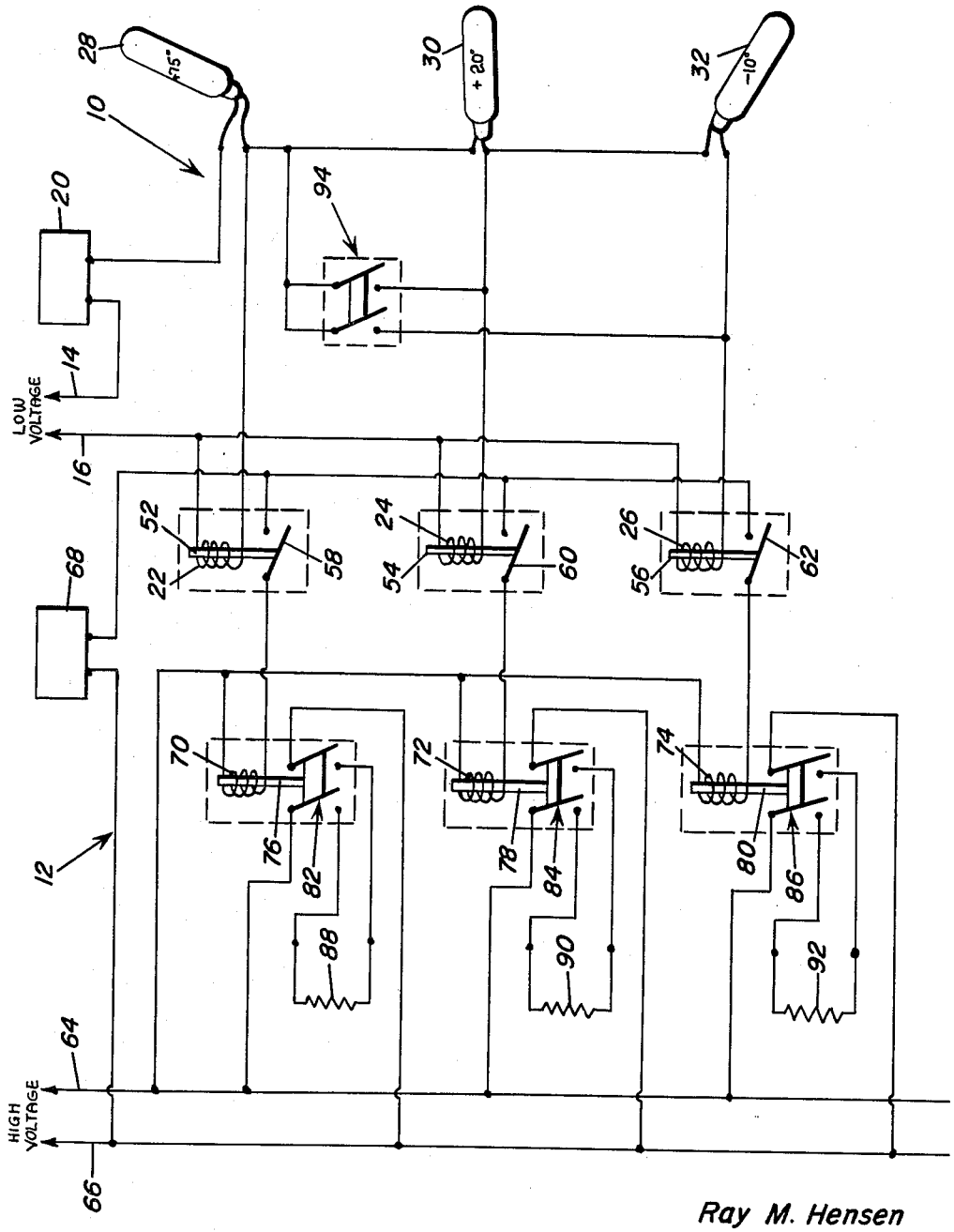
FIGURE 1 is a schematic wiring diagram of the invention.
Figure 2:
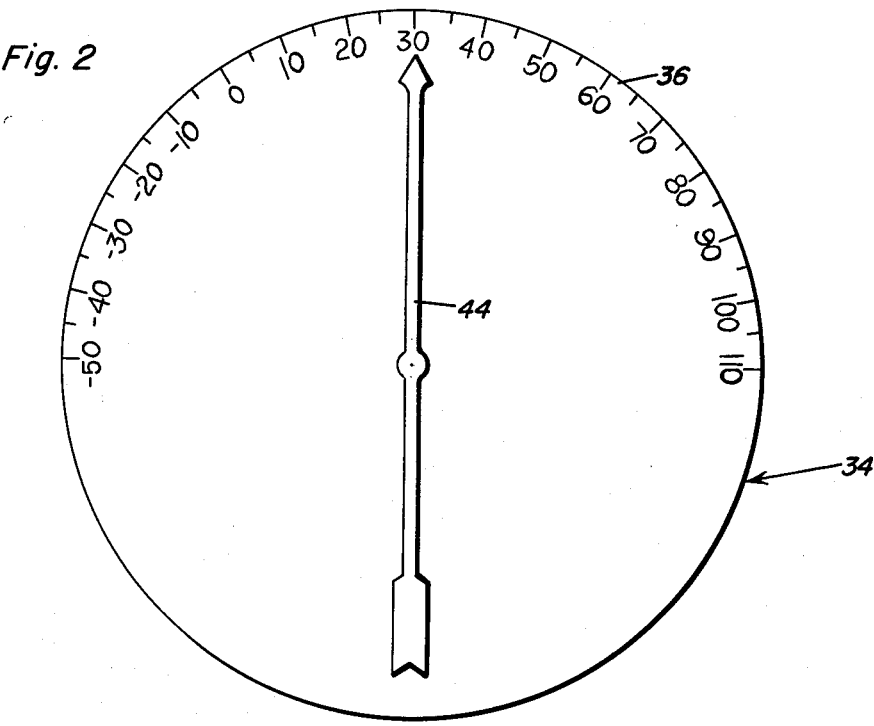
FIGURE 2 is an elevational front view of the graduated disk forming a portion of the temperature responsive switch means.
Figure 3:
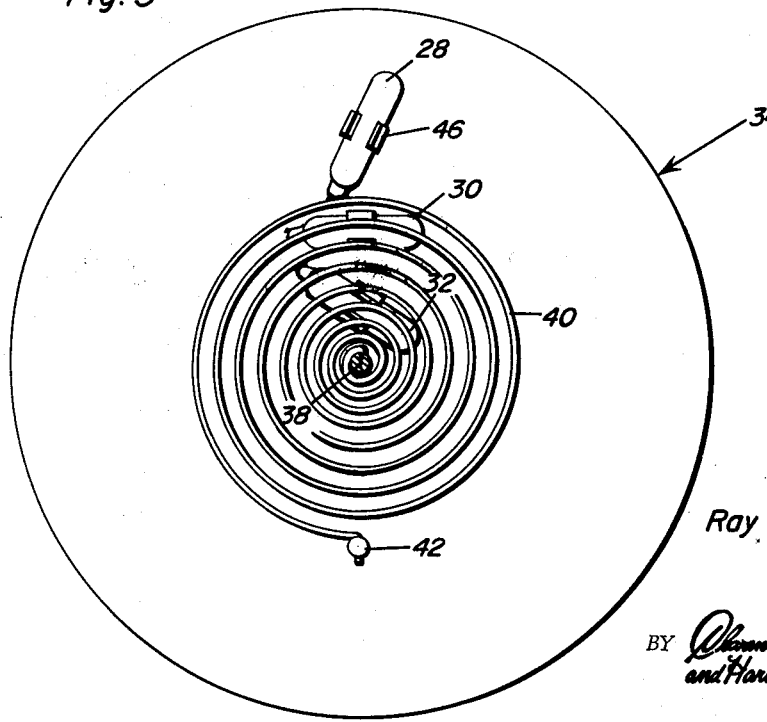
FIGURE 3 is an elevational rear view of the disk illustrating the adjustable vials and the coil spring for moving the disk to which the vials are adjustably secured.

With continuing reference to the drawings, and initial reference to FIGURE 1, a wiring diagram is illustrated wherein a low voltage control circuit generally designated as 10 and a high voltage heating circuit generally designated as 12 are shown. The low voltage control circuit includes a pair of conductors 14 and 16 electrically connected to a low voltage source. Serially connected in the conductor 14 is a conventional indoor thermostat 20 which is illustrated in block form. Serially connected with the indoor thermostat 20 are a plurality of parallel circuits including low voltage relay coils 22, 24 and 26. Temperature responsive switches 28, 30 and 32 are electrically connected in the low voltage circuit for allowing the low voltage relay coils 22, 24 and 26 to be energized dependent on the outside temperature. Digressing for a moment from FIGURE 1 to FIGURES 2 and 3, the operation of the temperature responsive switches 28, 30 and 32 will be considered.

A disk 34 is provided having graduations 36 etched or imprinted thereon. The disk 34 is mounted for rotation about a central shaft 38. A coil spring 40 which is temperature responsive is secured between the shaft 38 and a boss 42 formed on the rear surface of the disk 34. Accordingly, upon variations in outdoor temperature, the spring 40 will either expand or contract and rotate the disk 34 in a corresponding direction with the graduations 36 aligning themselves with a fixed indicator or arrow 44 attached to the shaft 38. Adjustably secured to the rear surface of the disk 34 as by resilient clips 46, are vials or temperature responsive switches 28, 30 and 32. The vials carrying a conductive liquid therein and a pair of spaced contacts adapted to be bridged by the conductive liquid when the disk 34 carries the vials to a particular angular position. For purposes of discussion herein, it will be assumed that the vials 28, 30 and 32 have been set to close at temperatures of 75° F., 20° F. and minus 10° F.

Referring again to FIGURE 1, it will be seen therefore that if the indoor temperature is set for 70° F. by the indoor thermostat 20, when the temperature is 69° F., both the indoor thermostat 20 and the temperature responsive switch 28 will be closed to energize the low voltage relay coil 22. That is, the temperature responsive switch 28 will be closed as long as the outside temperature is under 75° F. If the outdoors temperature is under 20° F., the switch 30 will also close so that the relay coil 24 will be energized too.

Each of the relay coils 22, 24 and 26 are respectively associated with armatures 52, 54 and 56 attached to movable poles 58, 60 and 62 of single-pole single-throw switches. The poles 58, 60 and 62 form a portion of the high voltage heating circuit 12 which includes conductors 64 and 66 into a high voltage source. Electrically connected to the conductor 66 is a limit control 68 which is conventional and may be such as an aquastat, airstat, pressure control, etc. Each of the poles 58, 60 and 62 are associated with switches serially connected to the limit control 68 and form portions of circuits parallel to one another. A high voltage relay coil 70 is electrically connected to the pole 58, a high voltage relay coil 72 is electrically connected to the pole 60 and a high voltage relay coil 74 is electrically connected to the pole 62. Each of the high voltage relay coils 70, 72 and 74 are in turn electrically connected to the conductor 64. Armatures 76, 78 and 80 are respectively associated with the high voltage relay coils 70, 72 and 74 and control double-pole single-throw switches generally indicated as 82, 84 and 86. The double-pole single-throw switches 82, 84 and 86 are serially connected with the heating elements 88, 90 and 92 directly across the conductors 64 and 66 connected to the high voltage source.

The operation utilization and advantages of the invention are thought now to be apparent. When the temperature within a building is below the temperature set on the indoor thermostat 20, the thermostat 20 will be closed and either one, two or three heating coils will be energized to raise the indoor temperature, dependent upon the outdoor temperature and which of the temperature responsive switches 28, 30 and 32 are closed. Inasmuch as it is not necessary or desirable to energize all three heating elements if only a small gradient exists between the indoor temperature and outdoor temperature, as for example 69 ° F. and 70° F. respectively, the invention contemplates the energization of only the proper number of heat elements. However, if a large temperature gradient exists, for example, if the indoor temperature is 69° F. and the outdoor minus 15° F. it is desirable to energize all three heating elements so that the indoor temperature may be rapidly raised and the ensuing heat loss compensated for.

In order to enable the system to recover rapidly when desired, a double-pole single-throw toggle switch 94 is provided for shunting the temperature responsive switches 30 and 32 when desired. Accordingly, it will be seen that if the indoor thermostat 20 is closed along with the temperature responsive switch 28, closing of the quick recovery switch 94 will shunt the temperature responsive switches 30 and 32 to energize the low voltage relay coils 24 and 26 to ultimately energize the heating elements 90 and 92.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a building, an electric heating system therefor including indoor and outdoor temperature responsive means comprising a low voltage control circuit and a high voltage heating circuit, said low voltage control circuit including an indoor thermostat, said indoor thermostat serially connected to each of a plurality of parallel connected outdoor temperature responsive switches, means mounting said temperature responsive switches for closing at different outdoor temperature levels, and a low voltage relay coil serially connected to each of said temperature responsive switches, said high voltage circuit including a first switch responsive to the energization of each low voltage relay coil, each of said first switches electrically in series with a separate high voltage relay coil, a separate double-pole single-throw switch responsive to each of the high voltage relay coils, a plurality of heating elements, each of said heating elements electrically serially connected with one of said double-pole single-throw sitwches across a high voltage source.

2. The combination of claim 1 wherein a system limit control is serially connected with said first switch and high voltage coil across a high voltage source.

3. The combination of claim 1 wherein manual switch means are provided for selectively shunting said outdoor temperature responsive switches.

4. The combination of claim 1 wherein said means for mounting said outdoor temperature responsive switches include a graduated disk, a temperature responsive coil spring secured between said disk and a fixed point and vials having a conductive liquid and spaced contacts thereon adjustably angularly mounted on said disk.

References Cited in the file of this patent

UNITED STATES PATENTS

| | | |
|---|---|---|
| 2,400,735 | Bradford | May 21, 1946 |
| 2,467,084 | Gannon | Apr. 12, 1949 |
| 2,519,109 | Callender | Aug. 15, 1950 |
| 2,557,905 | Burton et al. | June 19, 1951 |